United States Patent [19]

Tsuetaki et al.

[11] Patent Number: 4,766,189

[45] Date of Patent: Aug. 23, 1988

[54] COMPOSITIONS FOR MAKING IMPROVED GAS PERMEABLE CONTACT LENSES

[75] Inventors: George F. Tsuetaki; Hidehiko Ono, both of Chicago, Ill.

[73] Assignee: Fused Kontacts of Chicago, Inc., Chicago, Ill.

[21] Appl. No.: 85,400

[22] Filed: Aug. 13, 1987

[51] Int. Cl.$^4$ .................... C08F 212/06; C08F 214/18
[52] U.S. Cl. .................................... 526/245; 526/279
[58] Field of Search ............................... 526/245, 279

[56] References Cited

U.S. PATENT DOCUMENTS

| 3,377,371 | 4/1968 | Quaal | 528/32 |
| 3,808,178 | 4/1974 | Gaylord | 526/279 |
| 4,216,303 | 8/1980 | Novicky | 526/279 |
| 4,709,066 | 11/1987 | Chapman | 526/279 X |

Primary Examiner—Joseph L. Schofer
Assistant Examiner—J. M. Reddick
Attorney, Agent, or Firm—Lockwood, Alex, FitzGibbon & Cummings

[57] ABSTRACT

A novel plastic composition material for use in making a corneal contact lens comprising the reaction product of:

(a) between about 20 and about 60% by weight of polymerizable silicate having the general formula:

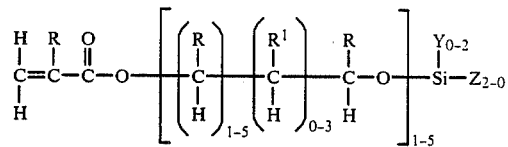

wherein
R=alkyl, aryl or H
R'=R or OR
Y=alkyl, vinyl, aryl or fluoroalkyl
Z=

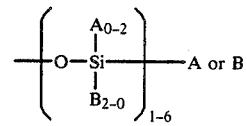

A=Y, or H
B=oxyalkyl, oxyaryl, oxyfluoroalkyl, oxyalkylacrylate, alkyl esters, aryl esters, fluoroalkylesters, or acrylic esters;

(b) from about 0 to about 9% of a polymerizable substituted or unsubstituted lower alkyl ester siloxane, including those having alkyl, aryl, or cycloalkyl substituents forming parts of the siloxane groups;

(c) from about 5% to about 50% of a polymerizable substituted or unsubstituted lower alkyl or cycloalkyl acrylic ester;

(d) at least 5% of a polymerizable fluoroacrylic ester;

(e) a wetting agent material which includes a mixture of acrylic or methacrylic acid and N-(1,1-dimethyl-3-oxybutyl)-acrylamide;

(f) at least one catalyst and sufficient crosslinking agents to provide a durable, machinable, oxygen permeable composition capable of being used in a corneal contact lens.

12 Claims, No Drawings

COMPOSITIONS FOR MAKING IMPROVED GAS PERMEABLE CONTACT LENSES

The present invention relates generally to improved polymerizable compositions suitable for use in making corneal contact lenses, and to lenses made from such compositions.

In recent years, corneal contact lenses having high oxygen permeability have become well known. High oxygen permeability has been sought to provide a contact lens which could be worn by a wearer for an extended period of time, desirably weeks or even months. High oxygen permeability also has advantages even where extended wear is not necessary or desirable; these include greater comfort and good overall permeability even in relatively thick lenses.

As is known, the cornea of the human eye requires constant supply of oxygen. Consequently, contact lenses of increased gas permeability provide the potential for extended wear, and in some cases, improved user comfort in relation to prior lenses. An ideal contact lens permits the corner of the eye to be comfortably bathed in lachrymal fluid (tears), and to receive a continuing fresh supply of atmospheric oxygen.

Patents describing compositions having certain gas permeability characteristics include U.S. Pat. No. 3,377,371 (Quaal); U.S. Pat. No. 3,808,178 (Gaylord); and U.S. Pat. No. 4,216,303 (Novicky).

However, a number of characteristics in addition to oxygen permeability are necessary for a lens to be worn for an extended period of time. For example, proteinaceous build-up or agglomeration on the lens drastically decreases oxygen permeability, and can have other negative effects on the performance of the lens. Many lenses which have high oxygen permeability are unduly brittle and display very high wetting angles; both of these properties are undesirable. In these and many other areas there exists much room for improvement in presently available, so-called, extended wear corneal contact lenses.

A lens which has optical clarity, ease of machinability, both chemical and mechanical stability, and wearer comfort, combined with high oxygen permeability, has the potential to be a lens capable of being worn comfortably for an extended time. When a contact lens is desired to be worn for an extended time, wearer comfort is exceptionally important. It is thus critical to combine high oxygen permeability with the additional features of wettability and lubricity, without compromising the before mentioned desirable characteristics. Chemical stability as used herein refers to a lens which will not hydrolyze or change in chemical composition with use. Mechanical stability as used herein refers to the retention of dimensional integrity and desired optical characteristics of the lens with use in the eye. Of course, optical characteristics must be satisfactory and remain so with the passage of time.

It has often been taught in the art that the characteristics of lubricity and wettability are antithetical. Adding components to lens composition to increase their wettability has often caused an increase in proteinaceous deposits, which deposits impair the oxygen permeability of the inner surface of the lens. Therefore, a proper balance of these characteristics is highly desirable. As mentioned above, an ideal lens will ride tightly enough on the eye to be secure, and loosely enough to permit the eye to be bathed in lachrymal fluid. It is thus important that the lens be compatible with the mucin in the lachrymal fluid (tears).

The wettability of a lens is determined by measuring the wetting angle of the lens. A wetting angle of less than about 25° is good, with angles of about 20° or less being superior. These angles are measured by the so-called CLMA method. The lens should also be resistant to the agglomeration or build-up of proteinaceous material on the lens in use in the eye. While these phenomena are often not well understood in great detail, it is believed that a proper balance of wettability to lubricity is important in dispersing and/or preventing adhesion of muco-proteins to the lens during use.

According to the present invention, polymeric compositions for use in the manufacture of a corneal contact lens, having high oxygen permeability, excellent optical clarity, excellent machinability, a combination of strength and flexibility, superior chemical stability, and combining a desirable low wetting angle and compatibility with the lachrymal fluid such that substantial agglomeration or build-up of mucoproteins on the lens is minimized or does not occur.

In view of the failure of the prior art to provide polymeric compositions capable of use in a corneal contact lens having all of the above desirable characteristics, including desirably low wetting angles and resistance to agglomeration of mucoproteins, it a a general object of the present invention to provide an improved contact lens having high oxygen permeability.

It is another object of the present invention to provide an improved compostion for use in contact lens which has an improved resistance to build up of mucoproteins.

It is a still further object of the present invention to provide an improved contact lens which has excellent optical clarity, machinability, superior chemical stability and a desirable mix of mechanical properties.

It is another object of the present invention to provide an improved composition for making a contact lens having a wetting angle of less than 25°, and which also resists protein agglomeration so as to remain lubricous, comfortable and clear in use.

The invention achieves these and other objects and advantages by providing a polymerized composition comprising the reaction product of from about 20 to about 60% by weight of polymerizable silicate having the general formula:

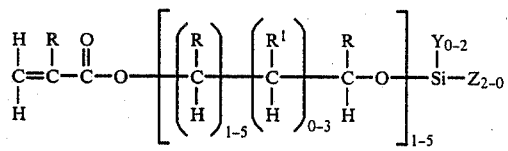

wherein
R = alkyl, aryl or H
R' = R or OR
Y = alkyl, vinyl, aryl or fluoroalkyl
Z =

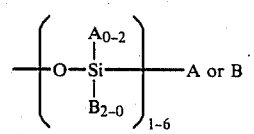

A or B

A=Y, or H

B=oxyalkyl, oxyaryl, oxyfluororalkyl, oxyalkylacylate, alkylesters, aryl esters, fluoroalkylesters, or acrylic esters; from about 0 to about 15% of a polymerizable substituted or unsubstituted lower alkyl ester siloxane that may have alkyl, aryl, or cycloalkyl substituents forming parts of the siloxane groups; up to about 15% of an acrylic ester made from a fluoroalkyl alcohol, a wetting agent material which includes a mixture of methacyrylic acid and N-(1,1-dimethyl-3-oxobutyl)-acrylamide, other conventional polymerizable alkyl, aryl, or cycloalkyl acrylic esters, and sufficient catalysts and crosslinking agents to provide a durable, machinable, oxygen permeable composition capable of being used in a corneal contact lens.

The manner in which the foregoing and other objects and advantages of the invention are achieved in practice will become more clearly apparent when reference is made to the following examples illustrating the practice of the preferred embodiments of the invention.

DESCRIPTION OF THE PREFERRED EMBODIMENTS OF THE INVENTION

While it will be understood that the invention may be practiced in different ways, and that the invention has utility other that that specifically described herein, such as utility in manufacturing things other than contact lenses, a description of the invention will be given by way of various examples, wherein the product made is a corneal contact lens.

For certain details of making the novel compositions which are in turn incorporated into the materials and lenses of the present invention, references is made to U.S. patent application Ser. No. 754,590, filed July 15, 1985, now U.S. Pat. No. 4,709,066, issued Nov. 24, 1987.

Suitable conventional alkyl, aryl, or cycloalkyl acrylic esters which may be employed in the practice of the invention include the following:

methyl acrylate, methyl methacrylate, ethyl acrylate, ethyl methacrylate, propyl acrylate, proypl methacrylate, isopropyl acrylate, isopropyl methacrylate, 2-ethylhexyl acrylate, 2-ethylhexyl methacrylate, cyclohexyl acrylate, cyclohexyl methacrylate, benzyl acrylate benzyl methacrylate, phenyl acrylate, phenyl methacrylate, with methyl acrylate, methylmethacrylate and cyclohexylmethacrylate being preferred.

Suitable cross-linking monomers include difunctional compounds such as:
ethyleneglycoldimethacrylate,
diethyleneglycoldimethacrylate,
triethyleneglycoldimethacrylate,
tetraethyleneglycoldimethacrylate,
polyethyleneglycoldimethacrylate,
divinyl benzene,
tetramethyldisiloxanyldi(methylmethacrylate), and mixtures thereof.

Suitable wetting agents include, but are not limited to:

acrylic acid, methacrylic acid (MAA), N-vinyl 2-pyrrolidine, N-(1,1-dimethyl 1-3-oxobutyl)-acrylamide) sometimes herein referred to as "diacetone acrylamide" or "DAAM", and hydroxyalkyl esters of acrylic and methacrylic acids, and mixtures thereof. The wetting agents used in making compositions of the present invention include the above DAAM and acrylic or methacrylic acid, with or without other wetting agents.

In the following non-limiting examples, all parts are by weight.

EXAMPLE 1

A composition for use in manufacturing a corneal contact lens was produced, using the general procedure described in U.S. patent application Ser. No. 754,590, by combining the following ingredients:

(a) 33.0 parts
Tris-(trimethylsiloxy)-2-methyacrloxy propoxy silicate; ("Tris-HPMA silicate")

(b) 7.0 parts
1,1,3,3-tetrakis(trimethylsiloxy)-bis(methacryloxypropyl)-disiloxane ("Siloxane dimer");

(c) 39.5 parts methyl methacrylate (MMA);

(d) 8.0 parts trifluoroethyl methacrylate (TFEMA);

(e) 7.0 parts methacrylic acid (MMA);

(f) 3.5 parts
tetraethyleneglycoldimethylacrylate (TEGDMA);

(g) 2.0 parts
N-(1,1-dimethyl-3-oxobutyl)-acrylamide (DAAM).

(h) 0.08 parts catalyst
(t-butylperoctoate)(t-bp)

(i) 0.16 parts catalyst t-butyl peroxypivalate) (L-11).

The structural formula for the above siloxane dimer is as follows:

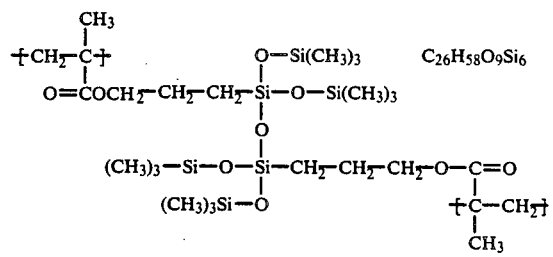

This product may include as impurities a monoester rather than the diester composition shown; other reaction products may be present in minor amounts. The composition was cured in a glass tube of about 18 mm outside diameter, and individual "buttoms" or lens blanks were made therefrom. Finally individual contact lenses were made from the blanks. The corneal contact lenses which were made were tested for wetting angle using the so-called bubble technique accepted by the CLMA. The wetting angle was found to be 14.3 degrees.

Using the so-called polarographic test method accepted and commonly used in the contact lens industry a $D_k$ value of 25 was found at 35° C. $D_k$ refers to the units appearing in the expression:

$$D_k \times 10^{-11} \left( \frac{cm^2 \times ml\ O_2}{sec} \times ml \times mmHg \right)$$

The other physical properties of the lens were similar to those described in connection with the following Examples 2 and 5.

EXAMPLE 2

A composition for use in manufacturing a corneal contact lens was produced as in Example 1 by combining the following proportions of the ingredients referred to in Example 1:

| Compound | Parts |
|---|---|
| Tris HPMA Silicate | 37.4 |
| Siloxane dimer | 8.0 |
| MMA | 33.0 |
| TFEMA | 8.0 |
| MAA | 8.0 |
| TEGDMA | 3.5 |
| DAAM | 2.1 |
| Total | 100.0 |

Added Materials:

| Compound | Parts |
|---|---|
| Catalyst (L-11) | 0.16 |
| Catalyst (T-bp) | 0.08 |

The composition was formed in tubes and then cut into blanks from which contact lenses were made. Physical properties of the lens were tested and the results are as follows:

| | |
|---|---|
| Gas Permeability ($D_k$) | 50.0 |
| Hardness | 86.0 |
| Wetting Angle | 15.0° |
| Water Absorption | less than 1% |
| Refractive Index | 1.460 |
| Specific Gravity | 1.106 |
| Light Transmission | at least 95% |

Test methods were as follows:

| | |
|---|---|
| Gas Permeability | See Example 1 |
| Hardness | Shore hardness ANZI/ASTM |
| Wetting Angle | Per CLMA; see example 1 |
| Water Absorption | ANSI/280.6; 5.6.1 |
| Refractive Index | ANZI/ASTM D542-20 |
| Light Transmission | 95% min. |

EXAMPLE 3

A composition for use in manufacturing a corneal contact lens was made by combining the following ingredients.

| Compound | Parts |
|---|---|
| Tris-HPMA Silicate | 44.0 |
| Siloxane Dimer | 9.0 |
| MMA | 24.5 |
| TFEMA | 8.0 |
| MAA | 8.0 |
| TEGDMA | 3.5 |
| DAAM | 3.0 |
| Total | 100.0 |

Added Materials:

| Compound | Parts |
|---|---|
| Catalyst (L-11) | 0.16 |
| Catalyst (t-bp) | 0.08 |

The wetting angle of material of this composition was 16.0°; the $D_k$ was 75. The lens was tested as described in Example 1. Other physical properties were the same as, or similar to, those described in Examples 2 and 5.

EXAMPLE 4

A composition for use in manufacturing a corneal contact lens was manufactured by combining the following ingredients:

| Compound | Parts |
|---|---|
| Tris-HPMA Silicate | 51.0 |
| Siloxane Dimer | 9.0 |
| MMA | 16.8 |
| TFEMA | 8.0 |
| MAA | 8.0 |
| TEGDMA | 3.5 |
| DAAM | 3.7 |
| Total | 100.0 |

Added Materials:

| Compound | Parts |
|---|---|
| Catalyst (L-11) | 0.16 |
| Catalyst (t-bp) | 0.08 |

The wetting angle of material of this composition was 17.0°; the $D_k$ was 100. The composition was tested for this property and others as set forth in Example 1.

EXAMPLE 5

A composition for use in manufacturing a corneal contact lens was manufactured by combining the following ingredients:

| Compound | Parts |
|---|---|
| Tris-HPMA silicate | 43.0 |
| Siloxane dimer | 9.0 |
| MMA | 25.7 |
| TFEMA | 8.0 |
| MAA | 8.0 |
| TEGDMA | 3.5 |
| DAAM | 2.8 |
| Total | 100.0 |

Added Materials:

| Compound | Parts |
|---|---|
| Catalyst (t-bp) | 0.08 |
| Catalyst (L-11) | 0.16 |

EXAMPLE 6

A composition was made using the same ingredients as set forth in Example 5, except that in place of the tris-HPMA silicate, an equal amount of a composition referred to as [tris(tri-sec-butoxysiloxy)]silyloxy ethyl-2-methacrylate was used. The resulting composition produced a material which was satisfactory for making contact lenses.

EXAMPLE 7

A composition was made using the same ingredients as set forth in Example 5, except that tris(trimethylsiloxy)-2-methacryloxy ethyl silicate was used. The resulting composition produced a material which was satisfactory for making contact lenses. Reference is made below to these and other silicate materials effectively forming a generic class of polymerizable acrylic silicates.

Physical properties of lens making materials made according to Example 5, above were tested using the methods described in connection with Example 1 with the following results:

| | |
|---|---|
| Gas Permeability ($D_k$) | 68.0 |
| Hardness | 85.0 |
| Wetting Angle | 16.0° |
| Water absorption | less than 1% |
| Refractive Index | 1.457 |
| Specific Gravity | 1.097 |

In the foregoing examples, methyl methacrylate ("MAA") was set forth as an example of a polymerizable substituted or unsubstituted lower alkyl, aryl or cycloalkyl acrylic ester, which comprises the acrylic ester constituent. This constituent may also be made, as is known to those skilled in the art, using one or more other esters, or mixtures thereof, taken from the following group:

methyl acrylate, methyl methacrylate, ethyl acrylate, ethyl methacrylate, propyl acrylate, proypl methacrylate, isopropyl acrylate, isopropyl methacrylate, 2-ethylhexyl acrylate, 2-ethylhexyl methacrylate, cyclohexyl acrylate, cyclohexyl methacrylate, benzyl acrylate benzyl methacrylate, phenyl acrylate, phenyl methacrylate, with methylacrylate, methylmethacrylate and cyclohexylmethacrylate being preferred.

Suitable cross-linking monomers include difunctional compounds such as:
ethyleneglycoldimethacrylate,
diethyleneglycoldimethacrylate,
triethyleneglycoldimethacrylate,
tetraethyleneglycoldimethacrylate,
polyethyleneglycoldimethacrylate,
divinyl benzene,
tetramethyldisiloxananyldi(methylmethacrylate), and mixtures thereof.

Suitable wetting agents include, but are not limited to:
acrylic acid, methacrylic acid (MAA), N-vinyl 2-pyrrolidone, N-(1,1-dimethyl 1-3-oxobutyl)-acrylamide) (DAAM), and hydroxyalkyl esters of acrylic and methacrylic acids, and mixtures thereof. The wetting agent of the present invention preferably includes DAAM and MAA, with or without other known wetting agents.

An effective amount of the fluorocarbon acrylic esters used in the composition of the present invention is that which provides a contact lens with an appropriate balance of wettability and lubricity. This amount is typically bout 5% and 8% by weight, but can range from 2% or 3% up to about 15% or more.

Suitable fluorocarbon acrylic esters for use in the composition preferably have the general formula:

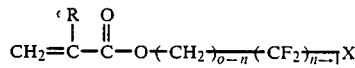

wherein
X = a hydrogen or fluorine
R = a methyl group or hydrogen
n = an integer from 1 to 20

Polymerizable substituted or unsubstituted lower alkyl ester siloxanes that may have alkyl, aryl, or cycloalkyl substituents forming parts of the siloxane groups are preferably present in the range of about 6% to 9% by weight.

Suitable catalysts include t-butyl peroctoate and t-butyl peroxypivalate; other known catalysts are available.

Generically speaking, the polymerizable acrylic silicates are those resulting from the reaction of a substituted or an unsubstituted chlorosilane with an acrylic ester having hydroxyl functionality. Examples of such esters are hydroxyethyl methacrylate, hydroxy propyl methacrylate and 2, 3 dihydroxy propyl methacrylate. The silanes typically include tris(tri-sec-butoxysiloxy)silane and tris(trimethylsiloxy)chlorosilane. Numerous other examples appear in the above referenced application Ser. No. 754,590, filed July 15, 1985, and now U.S. Pat. No. 4,709,066.

While the present invention is not intended to be limited to any particular theory of operation, it is believed that in the combination of ingredients, the fluoroacrylic ester acts to disperse agglomerated mucoprotiens or to prevent their agglomeration. Compositions otherwise similar which do not have fluoroacrylic esters do not provide the resistance against deposition of mucoproteins on the lens surfaces. In addition, it is known that siloxane and silicate acrylic esters provide lens composition which are more hydrophobic than lenses made from PMMA or other individual acrylic esters and combinations thereof.

According to the invention, much better wettability is achieved with the combination DAAM/acrylic acid wetting agent than can be achieved without this composition.

The present invention makes possible the achievement of wetting angles which are very satisfactory without using excessive acrylic or methacrylic acid.

Needless to say, the advantages of high gas permeability cannot be realized if wearing life is compromised by discomfort arising from other sources, namely, mucoprotein agglomeration and/or poor wettability.

The present invention provides compositions suitable for making superior lenses without compromising the known advantages of high permeability lenses. The use of silicate rather than silicone acrylic esters is also an important part of the invention.

The described silicates are effective to make contact lenses which are free from problems such as crazing or cracking with age and/or with hydrolytic decomposition.

We claim:

1. A novel composition suitable for use in a corneal contact lens comprising the reaction product of:
   (a) between about 20 and about 60% by weight of polymerizable silicate having the general formula:

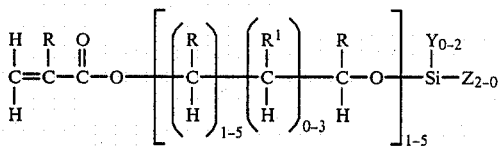

wherein
R = alkyl, aryl or H
R' = R or OR
Y = alkyl, vinyl, aryl or fluoroalkyl
Z =

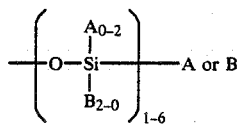

A = Y, or H
B = oxyalkyl, oxyaryl, oxyfluoroalkyl, oxyalkylacrylate, alkyl esters, aryl esters, fluoroalkylesters, or acrylic esters;
(b) from about 0 to about 9% of a polymerizable substituted or unsubstituted lower alkyl ester siloxane, including those having alkyl, aryl, or cycloalkyl substituents forming parts of the siloxane groups;
(c) from about 5% to about 50% of a polymerizable substituted or unsubstituted lower alkyl or cycloalkyl acrylic ester;
(d) at least 5% of a polymerizable fluoroacrylic ester;
(e) a wetting agent material which includes a mixture of acrylic or methacrylic acid and N-(1,1-dimethyl-3-oxobutyl)-acrylamide;
(f) at least one catalyst and sufficient crosslinking agents to provide a durable, machinable, oxygen permeable composition capable of being used in a corneal contact lens.

2. The composition of claim 1 wherein said lower alkyl ester siloxane is present in the range of between about 6% and 9%.

3. The composition of claim 1 wherein said polymerizable fluoroacrylic ester is present in an amount of from about 6% to 9% by weight of said composition.

4. The composition of claim 1 wherein said polymerizable silicate is present in an amount of from about 30% to 55% by weight, said lower alkyl ester siloxane is present in an amount of from about 6% to 9% and wherein said acrylic ester in an amount of from about 10% to about 40% by weight.

5. The composition of claim 1 wherein said lower alkyl ester siloxane is selected from the class which includes 1,1,3,3-tetrakis(trimethylsiloxy)-bis(methacryloxypropyl)-disiloxane and its precursors.

6. The composition of claim 1 wherein said wetting agent also includes a compound selected from the group consisting of N-vinyl-2-pyrollidone, hydroxyl esters of acrylic and methacrylic acids, and mixtures thereof.

7. The composition of claim 6 wherein said wetting agent is present in an amount of from about 7% to about 12% by weight.

8. The composition of claim 1 wherein said catalyst is selected from the group consisting of t-butyl peroctoate, t-butyl peroxypivalate, and mixtures thereof.

9. The composition of claim 1 wherein said polymerizable acrylic ester is selected from the group consisting of methylacrylate, methylmethacrylate, and cyclohexylmethacrylate.

10. The composion of claim 1 wherein said crosslinking agent is selected from the group consisting of:
ethyleneglycoldimethacrylate,
diethyleneglycoldimethacrylate,
triethyleneglycoldimethacrylate,
tetraethyleneglycoldimethacrylate,
polyethyleneglycoldimethacrylate,
divinyl benzene,
tetramethyldisiloxanyldi(methylmethacrylate), and mixtures thereof.

11. The composition of claim 1 wherein said fluoroacrylic ester has the general formula:

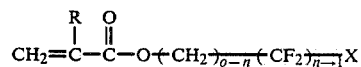

wherein
X = a hydrogen or fluorine
R = a methyl group or hydrogen
n = an integer from 1 to 20.

12. A method of making a novel composition for use in a corneal contact lens, said method comprising reacting:
(a) between about 20 and about 60% by weight of polymerizable silicate having the general formula:

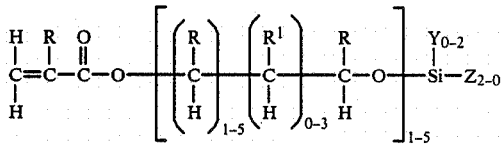

wherein
R = alkyl, aryl or H
R' = R or OR
Y = alkyl, vinyl, aryl or fluoroalkyl
Z =

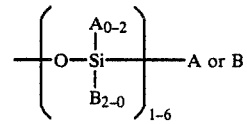

A = Y, or H
B = oxyalkyl, oxyaryl, oxyfluororalkyl, oxyalkylacrylate, alkyl esters, aryl esters, fluoroalkylesters, or acrylic esters;
(b) from about 0 to about 9% of a polymerizable substituted or unsubstituted lower alkyl ester siloxane, including those having alkyl, aryl, or cycloalkyl substituents forming parts of the siloxane groups;
(c) from about 5% to about 50% of a polymerizable substituted or unsubstituted lower akyl or cycloalkyl acrylic ester;
(d) at least 5% of a polymerizable fluoroacrylic ester;
(e) a wetting agent material which includes a mixture of acrylic or methacrylic acid and N-(1,1-dimethyl-3-oxobutyl)-acrylamide;
(f) at least one catalyst and sufficient crosslinking agents to provide a durable, machinable, oxygen permeable composition capable of being used in a corneal contact lens.

* * * * *